US012759239B2

(12) United States Patent
Reddy et al.

(10) Patent No.: US 12,759,239 B2

(45) Date of Patent: Oct. 13, 2026

(54) TRIANGULATION-BASED ANOMALY DETECTION IN THREE DIMENSIONAL PRINTERS

(71) Applicant: Peridot Print LLC, Palo Alto, CA (US)

(72) Inventors: Prakash Reddy, Palo Alto, CA (US); Prateek Kumar Sikdar, Bangalore (IN); Amit Kumar, Bangalore (IN); Manivannan Srinivasan, Bangalore (IN)

(73) Assignee: PERIDOT PRINT LLC, Palo Alto, CA (US)

( * ) Notice: Subject to any disclaimer, the term of this patent is extended or adjusted under 35 U.S.C. 154(b) by 344 days.

(21) Appl. No.: 18/282,878

(22) PCT Filed: Mar. 24, 2021

(86) PCT No.: PCT/US2021/023831

§ 371 (c)(1),
(2) Date: Sep. 19, 2023

(87) PCT Pub. No.: WO2022/203663

PCT Pub. Date: Sep. 29, 2022

(65) Prior Publication Data

US 2024/0157652 A1 May 16, 2024

(51) Int. Cl.

| | |
|---|---|
| ***B29C 64/393*** | (2017.01) |
| ***B33Y 50/02*** | (2015.01) |
| ***G06T 7/00*** | (2017.01) |

(52) U.S. Cl.

CPC .......... *B29C 64/393* (2017.08); *G06T 7/0004* (2013.01); *B33Y 50/02* (2014.12)

(58) Field of Classification Search

CPC ..... B29C 64/393; G06T 7/0004; B33Y 50/02; G06F 2119/02; G06F 2119/18; G06F 2113/10; G06F 30/27

See application file for complete search history.

(56) References Cited

U.S. PATENT DOCUMENTS

| | | | |
|---|---|---|---|
| 10,265,911 | B1 | 4/2019 | Capri et al. |
| 2012/0256916 | A1 | 10/2012 | Kitamura et al. |
| 2016/0236414 | A1 | 8/2016 | Reese et al. |

(Continued)

FOREIGN PATENT DOCUMENTS

| | | | | |
|---|---|---|---|---|
| EP | 3739495 | A2 * | 11/2020 | .............. B22F 10/80 |
| WO | 2020/102757 | A1 | 5/2020 | |

OTHER PUBLICATIONS

Goh et al. "A review on machine learning in 3D printing: applications, potential, and challenges;" Artificial Intelligence Review, 54:63-94, Published on Jul. 16, 2020, (Year: 2020).*

*Primary Examiner* — Chad G Erdman

(74) *Attorney, Agent, or Firm* — Michael Dryja

(57) ABSTRACT

Examples of systems for triangulation-based detection of anomaly in a print job performed by a three-dimensional printer are described herein. In an example, a data pertaining to a set of layers printed based on the print job of the 3D printer may be provided to two models to obtain respective predicted anomalies. Thereafter, the obtained predicted anomalies may be triangulated to detect an anomaly in the layer being printed by the 3D printer.

19 Claims, 6 Drawing Sheets

(56) References Cited

U.S. PATENT DOCUMENTS

| | | | | |
|---|---|---|---|---|
| 2017/0348900 | A1 | 12/2017 | Williams et al. | |
| 2017/0372480 | A1 | 12/2017 | Anand et al. | |
| 2019/0248078 | A1 | 8/2019 | Domröse et al. | |
| 2019/0283333 | A1 | 9/2019 | Hwang et al. | |
| 2020/0100871 | A1* | 4/2020 | Wang | G06F 30/27 |
| 2022/0042924 | A1* | 2/2022 | Beckett | B22F 10/38 |

* cited by examiner

TRIANGULATION-BASED ANOMALY DETECTION IN THREE DIMENSIONAL PRINTERS

BACKGROUND

Three-dimensional (3D) printers are employed in additive manufacturing processes, also known as 3D printing. In 3D printing, a 3D object or any part thereof is fabricated by laying down successive layers of material one on top of each other. The 3D printers may utilize nozzles for extruding a print material onto a work area to form a desired layer.

BRIEF DESCRIPTION OF FIGURES

The detailed description is provided with reference to the accompanying figures, wherein.

DETAILED DESCRIPTION

Figure 1:
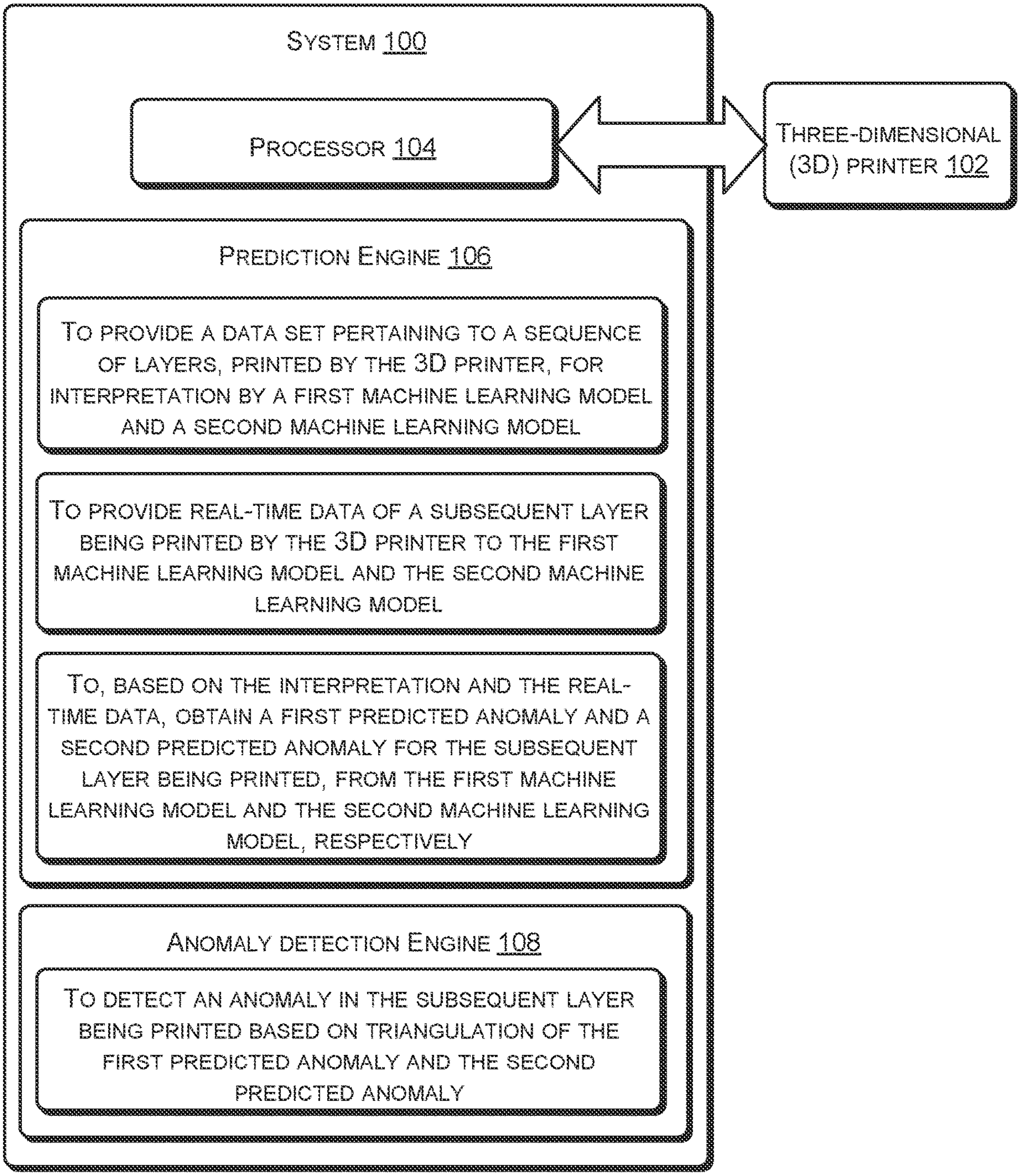
FIG. 1 illustrates a system for triangulation-based anomaly detection in a print job performed by a three-dimensional printer, according to an example.

Three-dimensional (3D) printers may sequentially deposit a material onto a material bed of the 3D printer to fabricate a prototype or a 3D object or a 3D part. In a 3D printing process, a first material-layer is formed, and thereafter, successive material-layers (or parts thereof) are added one by one, wherein each new material-layer is added on a pre-formed material-layer, until completely designed 3D object or 3D part is fabricated.

Tests may be performed to identify an anomaly or defect in the 3D printed part or object. If a 3D printed part or object fails any of the tests, the 3D printed part or object may be discarded. This may result in wastage of material and time. To save time, rule-based approaches are employed to find anomalies in 3D printed parts or objects. The rule-based approaches define specific rules to describe an anomaly and assign thresholds and limits. The rule-based approaches rely on experience of industry experts and are used for detecting known anomalies. The rule-based approaches are ineffective as these approaches may not consider effect of anomalies over a period of time.

Further, unsupervised machine learning models may be employed to detect anomalies in 3D printed parts or objects. An unsupervised machine learning model may provide false positives especially when there is insufficient data based on which the predictions are to be made. The false positives reduce an effectiveness of the predictions made by the unsupervised machine learning model. In addition, the unsupervised machine learning model may also be unable to provide causal explanations of the anomalies. To identify a root cause of an anomaly, domain experts may manually inspect the 3D printed part or object. This may result in a considerable lag between findings of the domain experts and any action taken based on these findings to tune printing parameters.

The present subject matter discloses example approaches for triangulation-based detection of anomalies in a print job performed by a 3D printer. For example, the present subject matter may perform triangulation of two or more machine learning models to detect anomalies in real-time in the layers being printed by the 3D printer. The triangulation of the two or more machine learning models facilitates in enhancing an output performance for the detection of anomalies in the print job, thereby providing precise predictions and reducing wastage of raw material used for printing.

In accordance with the present subject matter, a data set pertaining to a sequence of layers, printed by the 3D printer, is provided as an input for interpretation by a first machine learning model and a second machine learning model. For example, the machine learning models may include an autoencoder-decoder based model and a time series model that may independently predict a data set for a subsequent layer to be printed by the 3D printer.

In an example, the subsequent layer may be a layer immediate next to the sequence of layers printed by the 3D printer. For example, if the sequence of layers includes a sequence from $m^{th}$ layer to $n^{th}$ layer which have been printed by the 3D printer, the subsequent layer may be $n+1^{st}$ layer which is currently being printed by the 3D printer.

Thereafter, the first machine learning model and the second machine learning model may obtain real-time data of the subsequent layer being printed by the 3D printer. Based on the interpretation and the real-time data, the first machine learning model and the second machine learning model may provide a first predicted anomaly and a second predicted anomaly, respectively, for the subsequent layer being printed.

The present subject matter further describes triangulation of the first predicted anomaly and the second predicted anomaly to detect an anomaly in the layer being printed by the 3D printer. Triangulation facilitates validation of data through cross-verification from multiples sources. For example, the triangulation may involve concurrent or parallel utilization of the two or more machine learning models for carrying out separate predictions and obtaining respective prediction results. The obtained prediction results may be cross-corelated with each other for establishing a validity of the obtained results. In addition, factors responsible for the anomaly may be identified based on which the detected anomaly may be categorized into specific anomaly.

Accordingly, as the present subject matter performs triangulation of predictions of multiple machine learning models, the present subject matter facilitates in detecting propagating and persistent anomalies with accuracy. Further, the triangulation reduces any false positive outcomes and false negative error probabilities, thereby accurately detecting anomalies. In addition, the real-time anomaly detection may reduce raw material wastage, thereby is cost-efficient.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the systems and methods are implemented are explained in detail with respect to FIGS. 1-5. While aspects of described systems and methods can be implemented in any number of different electronic devices, environments, and/or implementations, the examples are described in the context of the following system(s). It is to be noted that drawings of the present subject matter shown here are for illustrative purposes and are not drawn to scale.

FIG. 1 illustrates a system 100 for triangulation-based anomaly detection in a print job performed by a 3D printer 102, according to an example. The system 100 may be communicatively coupled to the 3D printer 102. The 3D printer 102 may manufacture a 3D solid object from a digital file. Examples of the 3D printer 102 may include, but are not limited to, a fused deposition modeling (FDM) printer, a multi jet fusion (MJF) printer, and a selective laser sintering (SLS) printer. Examples of the system 100 may include, but are not limited to, a laptop, a notebook computer, a desktop computer.

The system 100 may include a processor 104 that may be communicatively coupled to the 3D printer 102. In an example, the processor 104 may be directly or remotely coupled to the 3D printer 102. The processor 104 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

Further, the system 100 may include a prediction engine 106 and an anomaly detection engine 108 coupled to the processor 104. The prediction engine 106 and the anomaly detection engine 108 may be implemented as a combination of hardware and programming, for example, programmable instructions to implement a variety of functionalities of the prediction engine 106 and the anomaly detection engine 108. In examples described herein, such combinations of hardware and programming may be implemented in several different ways. For example, the programming for the prediction engine 106 and the anomaly detection engine 108 may be executable instructions. Such instructions may be stored on a non-transitory machine-readable storage medium which may be coupled either directly with the system 100 or indirectly (for example, through networked means). In the present examples, the non-transitory machine-readable storage medium may store instructions that, when executed by the processor, implement the prediction engine 106 and the anomaly detection engine 108. In other examples, the prediction engine 106 and the anomaly detection engine 108 may be implemented as electronic circuitry.

The prediction engine 106 and the anomaly detection engine 108, amongst other things, include routines, programs, objects, components, and data structures, which perform particular tasks or implement particular abstract data types. The anomaly detection engine 108 may also be implemented as, signal processor(s), state machine(s), logic circuitries, and/or any other device or component that manipulates signals based on operational instructions. Further, the prediction engine 106 and the anomaly detection engine 108 can be implemented by hardware, by computer-readable instructions executed by a processing unit, or by a combination thereof.

In an example, the prediction engine 106 may provide a data set pertaining to a sequence of layers printed by the 3D printer 102 to a first machine learning model and a second machine learning model. In an example, the first machine learning model and the second machine learning model may be pre-trained. The first machine learning model and the second machine learning model may interpret the data set pertaining to the sequence of layers. The data set may include, but is not limited to, layer thickness, drop in a print platform, post drop surface of a layer, print surface of a layer, post spread surface of a layer, and disturbance in print. In addition, the data set may include attributes pertaining to each layer, such as ink density.

In the present example, the first machine learning model may be an encoder-decoder based model that may process the data set to generate a summary of the data set. Based on the summary, the first machine learning model may reconstruct a data set for the subsequent layer that is being printed by the 3D printer 102. In another example, the second machine learning model may be a time-series decomposition model that may process the data set to identify a pattern or trend of the sequence of layers.

Further, the prediction engine 106 may provide, real-time data of a subsequent layer being printed by the 3D printer 102 to the first machine learning model and the second machine learning model. In an example, the subsequent layer may be a layer immediate next to the sequence of layers printed by the 3D printer 102. For example, if the sequence of layers includes a sequence from $10^{th}$ layer to $20^{th}$ layer which have been printed by the 3D printer 102, the subsequent layer may be $21^{st}$ layer which is currently being printed by the 3D printer 102. Therefore, the prediction engine 106 may provide real-time data pertaining to the layer currently being printed by the 3D printer 102 to the first machine learning model and the second machine learning model.

Further, based on the interpretation and the real-time data, the prediction engine 106 may obtain a first predicted anomaly from the first machine learning model for the subsequent layer and obtain a second predicted anomaly from the second machine learning model for the subsequent layer. In an example, the first machine learning model and the second machine learning model may independently predict the anomaly in the subsequent layer.

In an example, the anomaly detection engine 108 may detect an anomaly in the subsequent layer being printed based on triangulation of the first predicted anomaly and the second predicted anomaly. For example, the anomaly detection engine 108 may cross-correlate the predicted anomalies, for the subsequent layer, from the first machine learning model and the second machine learning model. Based on the triangulation, the anomaly detection engine 108 may detect the layer being printed as anomalous if a cross-correlation score of the predicted anomalies is above a statistically derived threshold.

Accordingly, the system 100 employs deep learning techniques to detect, in-real time, anomalies associated with a layer being printed by the 3D printer 102. Further, triangulation of the predicted anomalies by two machine learning models facilitates in accurately capturing both global anomaly as well as local anomaly. This may avoid any wastage of print materiel as a user may take appropriate actions based on the knowledge that the anomaly has been detected.

Figure 2:
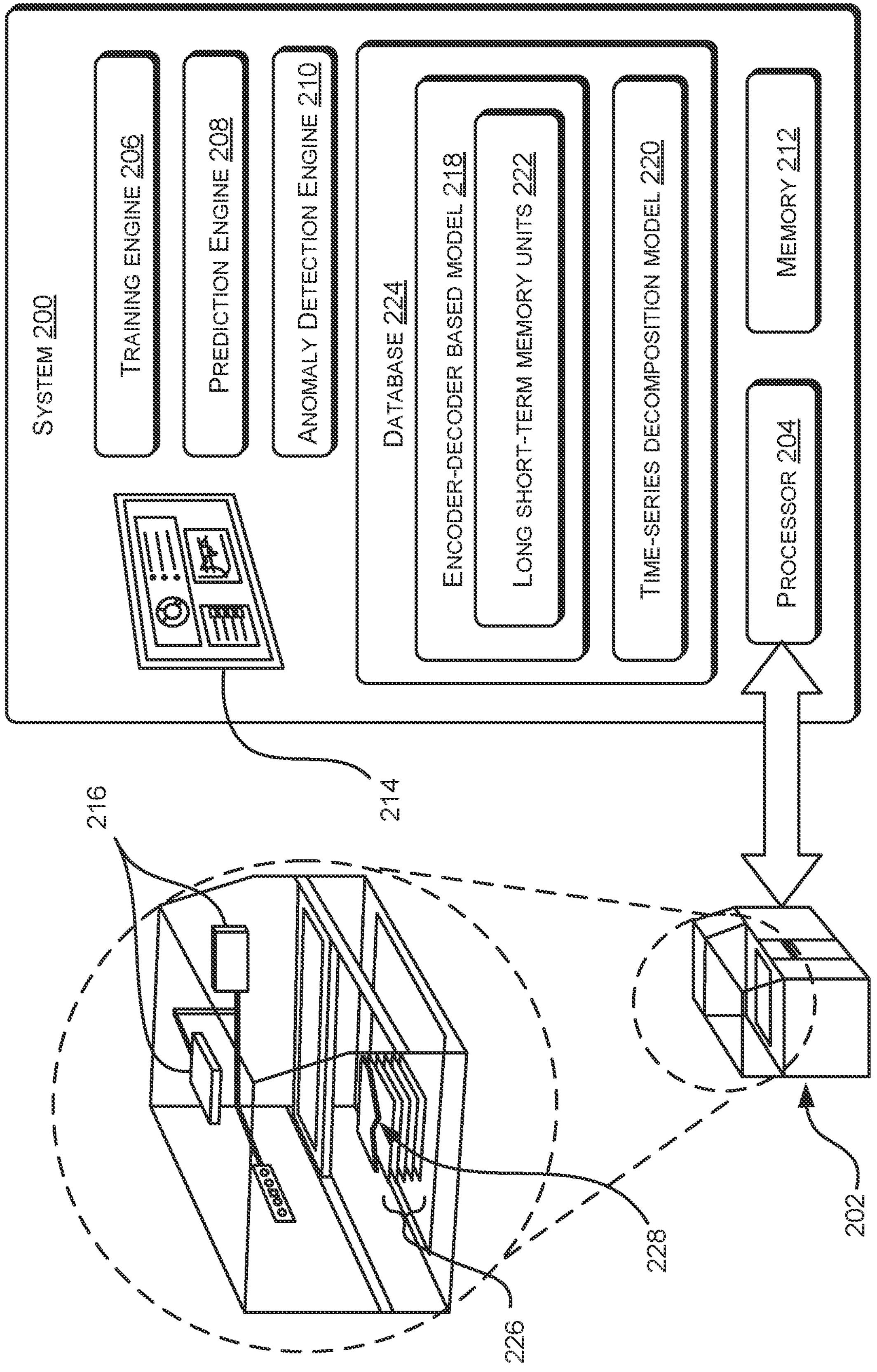
FIG. 2 illustrates a system for triangulation-based anomaly detection in a print job performed by a three-dimensional printer, according to an example.

FIG. 2 illustrates a system 200 for triangulation-based anomaly detection in a print job performed by a 3D printer 202, according to an example. The system 200 may be similar to the system 100. The system 200 may include a processor 204, a training engine 206, a prediction engine 208, and an anomaly detection engine 210. The processor 204, the prediction engine 208, and the anomaly detection engine 210 may be similar to the processor 104, the prediction engine 106, and the anomaly detection engine 108.

Further, the system 200 may include a memory 212. The memory 212 may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an example, the system 200 may include interface(s) 214. The interface(s) 214 may include a variety of interfaces, for example, interface(s) 214 for users. The interface(s) 214 may include data output devices. The interface(s) 214 may facilitate the communication of the system 200 with various communication and electronic devices, such as the 3D printer 202.

In an example, the 3D printer 202 may be a multi-jet fusion (MJF) 3D printer. The MJF 3D printer may use an inkjet array to selectively apply fusing agent and detailing agent across a bed of powdered material, which are then fused by heating elements into a solid layer. The 3D printer 202 may include a thermal chamber having a print bed on which a plurality of layers may get printed in response to a print job of the 3D printer 202. Further, the 3D printer 202 may include a plurality of sensors 216, such as humidity sensors, ambient temperature sensors, printhead sensors, thermal chamber pressure sensors, carriage pressure sensors, and so on.

In an example, a humidity sensor may be placed in a work area of the 3D printer 202. The work area may be the area in which the print bed of the 3D printer 202 is present. The humidity sensor may measure humidity of the work area before a printing process of the 3D printer 202 is started or during the printing process. In another example, an ambient temperature sensor may be placed in the work area to measure the ambient temperature of the work area. Further, the print head sensors may include a temperature sensor to measure temperature of a printhead during the printing process. In an example, the thermal chamber pressure sensors may be placed in the thermal chamber to measure air pressure inside the thermal chamber. In another example, a carriage pressure sensor may be placed in the work area in connection with a carriage which movably carries an inkjet array above the print bed. The carriage pressure sensor may measure a pressure being applied on the carriage during the printing process.

In an example, the training engine 206 may communicate with the processor 204 to obtain data set pertaining to a sequence of layers printed by the 3D printer 202. In the present example, the data set may include sensor data pertaining to the plurality of sensors 216. In addition, the data set may include layer surface data pertaining to the surface attributes of printed layers. In an example, the layer surface data may include, but is not limited to, layer thickness, drop in a print platform, post drop surface of a layer, print surface of a layer, post spread surface of a layer, and disturbance in print. The training engine 206 may provide the obtained data set to a first machine learning model and a second machine learning model. For example, the first machine learning model is an encoder-decoder based model 218 and the second machine learning model is a time-series decomposition model 220.

The training engine 206 may train the encoder-decoder based model 218 and the time-series decomposition model 220 using successfully completed print jobs. For example, the encoder-decoder based model 218 is trained for a predefined set of layers, such as last 10 layers printed, over about a million sequence records, where each sequence record contains six-layer surface statistical attributes. In an example, each sequence record may contain attributes other than surface statistical attributes. For example, the encoder-decoder based deep learning architecture may include long short-term memory (LSTM) units 222. The LSTM units 222 remember past data by generating a comprehensive summary of sequence in the form of last hidden state representation in reduced dimensional space. The LSTM units 222 of the encoder may summarize the sequence keeping salient information of all previous layers in the sequence. Based on the summary, the decoder may reconstruct the sequence from the last hidden state representation. Any gradient in the reconstructed sequence with respect to an actual sequence may be considered as a reconstruction error. During training, the reconstruction error is minimized by using an optimization technique, such as Gradient Descent.

Further, the time-series decomposition model 220 may be trained over six attributes of layer surface data for all previously printed layers associated with a plurality of sequence records. The six attributes of layer surface data may include a median value of layer thickness, a median value of post drop surface, a median value of post spread surface, and a median value of print surface. In an example, the time-series decomposition model 220 may be trained over attributes other than surface statistical attributes.

In an implementation, the time-series decomposition model 220 may decompose signal into three components, i.e., macro trend, periodic component, and remaining term. The time-series decomposition model 220 may be trained for consecutive layers with breaks for new print jobs. The time-series decomposition model 220 works on the underlying function:

$$y(l)=g(l)+s(l)+h(l)+\varepsilon$$

where, g(l) indicates a trend function which represents non-periodic changes in the value as a function of layer, s(l) represents periodic changes as a function of layer, h(l) represents break/gap effect as a function of layer, and ε represents a residual error term. During training, the time-series decomposition model 220 may learn above-mentioned function of layers along with a confidence interval of about 97.73%. During prediction, if the y(l) is outside the confidence interval, y(l) is flagged as anomaly for layer l.

After successful training, the training engine 206 may store a first trained machine learning model and a second trained machine learning model in a database 224 for future predictions.

During a printing phase, the prediction engine 208 may obtain a data set pertaining to a sequence of layers 226 printed by the 3D printer 202. In an example, the sequence of layers 226 may include one layer or multiple layers that have been printed by the 3D printer 202. In an example, the data set pertaining to the sequence of layers 226 may be pre-processed before being provided to the prediction engine 208. For example, the data set may be normalized using standard normal distribution. The standard normal distribution may include a mean as zero and a standard deviation as one.

In an example implementation, the prediction engine 208 may input the data set to the first trained machine learning model, such as the encoder-decoder based model 218 and the second trained machine learning model, such as the time-series decomposition model 220 to detect an anomaly in a subsequent layer 228 being printed. Based on the data set of the sequence of layers 226, the encoder of the encoder-decoder based model 218 may generate a hidden state representation of the data set. Based on the interpretation, the decoder may reconstruct data for the subsequent layer 228 based on the hidden state representation. The reconstructed data may indicate a predicted data pertaining to the subsequent layer 228 which is being printed by the 3D printer 202.

Accordingly, when the data set pertaining to the sequence of layers 226 is provided to the time-series decomposition model 220 for interpretation, the time-series decomposition model 220 may process the data set to identify a pattern or trend of the sequence of layers 226. Based on the pattern or trend, the time-series decomposition model 220 may indicate an expected position for a data pertaining to the subsequent layer 228 in the pattern or trend.

Thereafter, the prediction engine 208 may provide real-time data of the subsequent layer 228 being printed by the 3D printer 202 to the encoder-decoder based model 218 and the time-series decomposition model 220. Based on the interpretation and the real-time data, the encoder-decoder based model 218 and the time-series decomposition model 220 may generate a first predicted anomaly and a second predicted anomaly respectively in the subsequent layer 228 that is being printed by the 3D printer 202. The first predicted anomaly and the second predicted anomaly may be associated with corresponding anomaly scores.

In an example, the encoder-decoder based model 218 may compare the reconstructed data set with the real-time data for the subsequent layer 228. Based on the comparison, the encoder-decoder based model 218 may identify a deviation between the real-time data and the reconstructed data. In an example, the deviation may be identified as mean squared error. For example, the mean squared error may measure an average of squared of the errors, i.e., an average squared difference between the reconstructed data and the real-time data for the subsequent layer 228.

If the deviation is within a pre-defined matching threshold, the encoder-decoder based model 218 may interpret the subsequent layer 228 as non-anomalous. For example, the pre-defined matching threshold indicates an acceptable reconstruction error for normal behavior of the 3D printer 202. In an example, a histogram of various reconstruction errors is analyzed and based on the analysis the pre-defined threshold may be obtained. In the present example, the pre-defined matching threshold may be considered as a match percentage of about 97.73% with respect to a normal layer. Therefore, when the real-time data of a layer matches the reconstructed data to an extent of about 97.73%, the layer is considered as acceptable or non-anomalous. Likewise, if the real-time data of any layer which deviates from the reconstructed data and is below the pre-defined threshold, is considered as anomalous.

In case of the time-series decomposition model 220, a layer is predicted as anomalous if data pertaining to the layer may deviate significantly from robust trend obtained for the sequence of layers 226. In an example, if deviation in the data of the layer being printed from the trend is about 97.73%, the layer being printed is considered as anomalous.

In an example, the anomaly detection engine 210 may obtain the predicted anomalies from the encoder-decoder based model 218 and the time-series decomposition model 220. In an example, for obtaining the predicted anomaly from the encoder-decoder based model 218, the anomaly detection engine 210 may obtain an output from the encoder-decoder based model 218 defining a first probability score. In an example, the first probability score may be determined by computing a mean squared error value of multiple outputs from the encoder-decoder based model 218 in a particular window of layers. Thereafter, the mean squared error value may be normalized to obtain the first probability score. The first probability score may define a degree of deviation of the real-time data from the reconstructed data. For example, a higher value of the first probability score may represent a higher degree of deviation and a lower value of the first probability score may represent a lower degree of deviation.

For obtaining the predicted anomaly from the time-series decomposition model 220, the anomaly detection engine 210 may obtain an output from the time-series decomposition model 220 defining a second probability score. In an example, the second probability score is calculated by performing normalization of multiple outputs from the time-series decomposition model 220. For example, the second probability score is calculated by performing normalization of differentials of multiple outputs from the time-series decomposition model 220. The second probability score may define a degree of deviation of the data pertaining to the layer from robust trend obtained for the sequence of layers 226. For example, a higher value of the second probability score may represent a higher degree of deviation and a lower value of the second probability score may represent a lower degree of deviation.

Upon obtaining the first and second probability scores from the encoder-decoder based model 218 and the time-series decomposition model 220, the anomaly detection engine 210 may perform triangulation of the first and second probability scores to detect an anomaly in the subsequent layer 228 being printed. Triangulation facilitates validation of data through cross-verification from multiples sources. For example, the triangulation may involve concurrent or parallel utilization of the two or more machine learning models for carrying out separate predictions and obtaining respective prediction results. For example, the anomaly detection engine 210 may cross-correlate the first and second probability scores to objectively determine a cross-correlation score of both probability scores. For example, the anomaly detection engine 210 may derive a matching degree based on both the inputted probability scores. The cross-correlation score may provide an accurate deviation of the layer (being printed) with respect to the respective predicted anomalies of the encoder-decoder based model 218 and the time-series decomposition model 220.

In an example, the first and second probability scores may lie between 0 and 1. The first and second probability scores may be cross correlated by the anomaly detection engine 210 in a window of 10 layers to obtain the cross-correlation score. In an example, the cross-correlation may be performed by computing a sliding dot product or sliding inner-product of the first and second probability scores. For example, cross-correlation is computed for two windows of 10 layers. Hence, output vector for each window will be vector of values. Thereafter, the anomaly detection engine 210 may identify a maximum of the output vector for each window. This provides a single value (the cross-correlation score) for each window.

If the cross-correlation score is obtained above a statistically derived threshold, the anomaly detection engine 210 may mark the subsequent layer 228 as anomalous. Further, the anomaly detection engine 210 may mark an identifier of the subsequent layer 228 as anomalous layer identifier.

Further, the anomaly detection engine 210 may categorize the detected anomaly as one of a ghost layer anomaly, layer phase shifting anomaly, and a crazing anomaly. For example, the anomaly detection engine 210 may detect various contributing factors that may be responsible for the detected anomaly. In an example, to detect the contributing factors, the anomaly detection engine 210 may obtain individual mean squared error terms for each type of the layer surface data including, but not limited to, layer thickness, drop in a print platform, post drop surface of a layer, print surface of a layer, post spread surface of a layer, and disturbance in print. The anomaly detection engine 210 may then obtain an overall mean squared error term based on the individual mean squared error terms. Upon obtaining the overall mean squared error term, the anomaly detection engine 210 may determine the individual mean squared error term which may be contributing more to the overall mean squared error term. For example, if mean square error terms for platform drop feature is contributing more in the overall mean squared error term, the anomaly detection engine 210 platform drop may be detected as a contributing factor in the anomaly.

Based on a detected factor, the anomaly detection engine 210 may categorize the detected anomaly as a ghost layer anomaly, layer phase shifting anomaly, or a crazing anomaly. For example, the anomaly detection engine 210 may detect a larger than expected median value of platform drop followed by several layers of alternating large and small median values of layer thickness. Based on such detection, the anomaly detection engine 210 may identify the presence of a ghost layer. The ghost layer may appear when a print is repeated more than once on a layer. Similarly, crazing may be identified by the anomaly detection engine 210 upon monitoring the deviations of spread surface, print surface, drop surface, and layer thickness.

In an example, the anomaly detection engine 210 may generate, in real-time, a notification informing degradation in a layer quality associated with the print job of the 3D printer 202 to a user. For example, when the anomaly detection engine 210 may detect that the cross-cross-correlation score of the subsequent layer 228 is above the statistically derived threshold, the anomaly detection engine 210 may generate a notification to inform the user about the anomaly. For example, the notification may be rendered on the interface(s) 214 to indicate a degradation in a quality of each layer that is being printed by the 3D printer 202. The interface(s) 214 may render graphs indicating anomalies or normal behavior in printed layers. The interface(s) 214 may also highlight relevant attributes of the layer surface data with respect to deviations in the data sets. The real-time quality assessment for each layer being printed may facilitate in preventing wastage of raw material used for the print job.

Such an indication may facilitate the user to abort the print job if the layer quality degradation is beyond an acceptable limit. Alternatively, the user may adjust, in real-time, the data set associated with a layer for which the layer quality has degraded, based on the notification generated by the anomaly detection engine 210. As a result, the user may minimize the layer quality degradation. For example, the anomaly detection engine 210 may provide a user with a restart print job, a terminate print job option or an option for real-time adjustment of the data set pertaining to the layer being printed or a continue printing option.

Further, once the print job is concluded, such as due to termination of the print job upon detection of the anomaly or upon completion of the print job, the anomaly detection engine 210 may generate a quality assessment report. The quality assessment report may be indicative of an overall quality of the print job which has been concluded. Based on the quality assessment report, quality testing of the 3D part/object fabricated as a result of the print job may be performed on.

In an example, the quality assessment report may provide a specific value to indicate an overall quality of the print job. The specific value may be generated by computing a weighted average of output obtained from a sliding dot product or a cross-correlation using sliding window. A lower value may indicate a good quality of the 3D printed object or part thereof. In addition, the quality assessment report may indicate contribution of various sensors and layer attributes for the detected anomaly. For example, upon detection of the anomaly, the anomaly detection engine 210 may determine a root cause of the anomaly based on contribution of data pertaining to the sensors 216 associated with the 3D printer 202 and the attributes pertaining to each layer being printed.

Although the present subject matter has been explained with reference to two machine learning models, the present subject matter may be implemented on more than two machine learning models. In addition, any machine learning models may be used based on the application and the machine learning models are not limited to the encoder-decoder based model and the time-series decomposition model.

Figure 3:
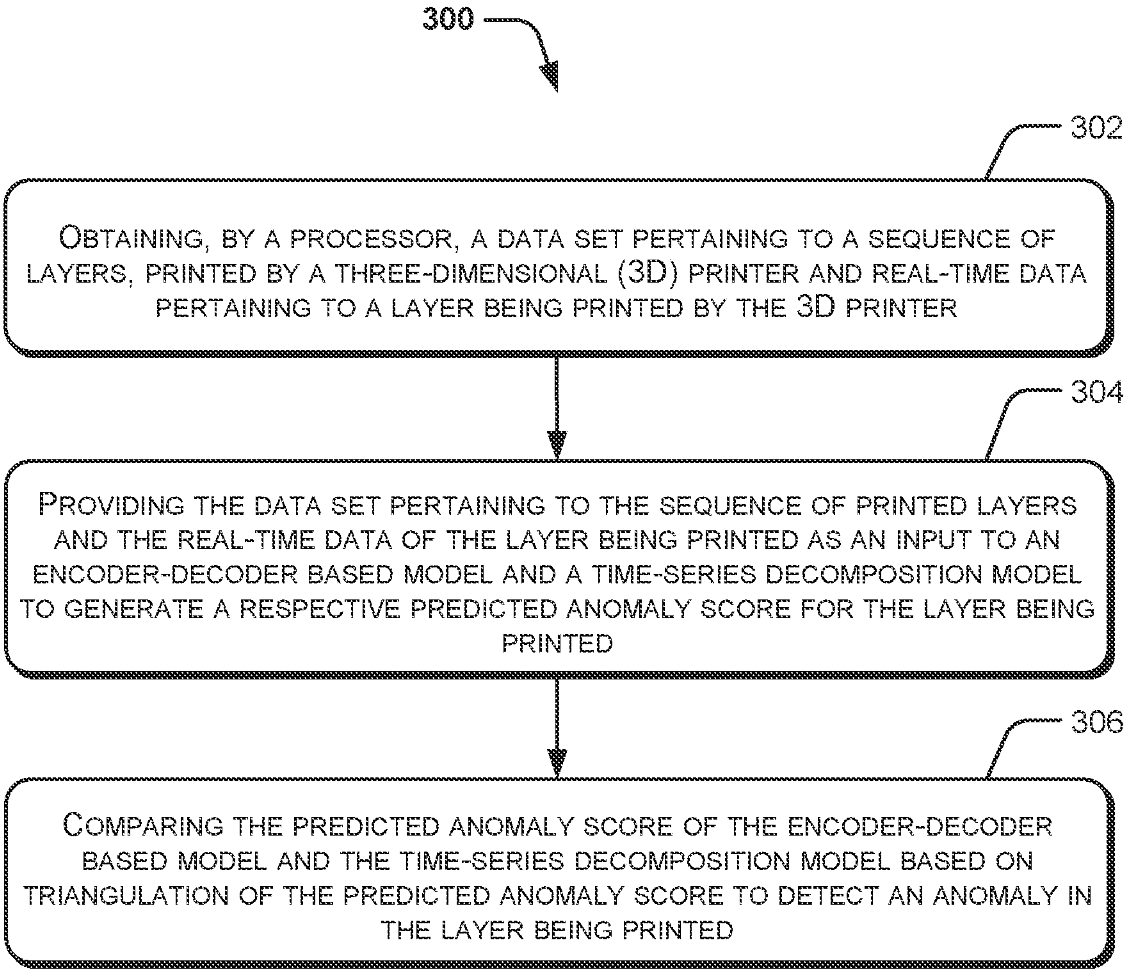
FIG. 3 illustrates a method for detecting anomaly based on triangulation in a print job performed by a three-dimensional printer, according to an example.
Figure 4A:
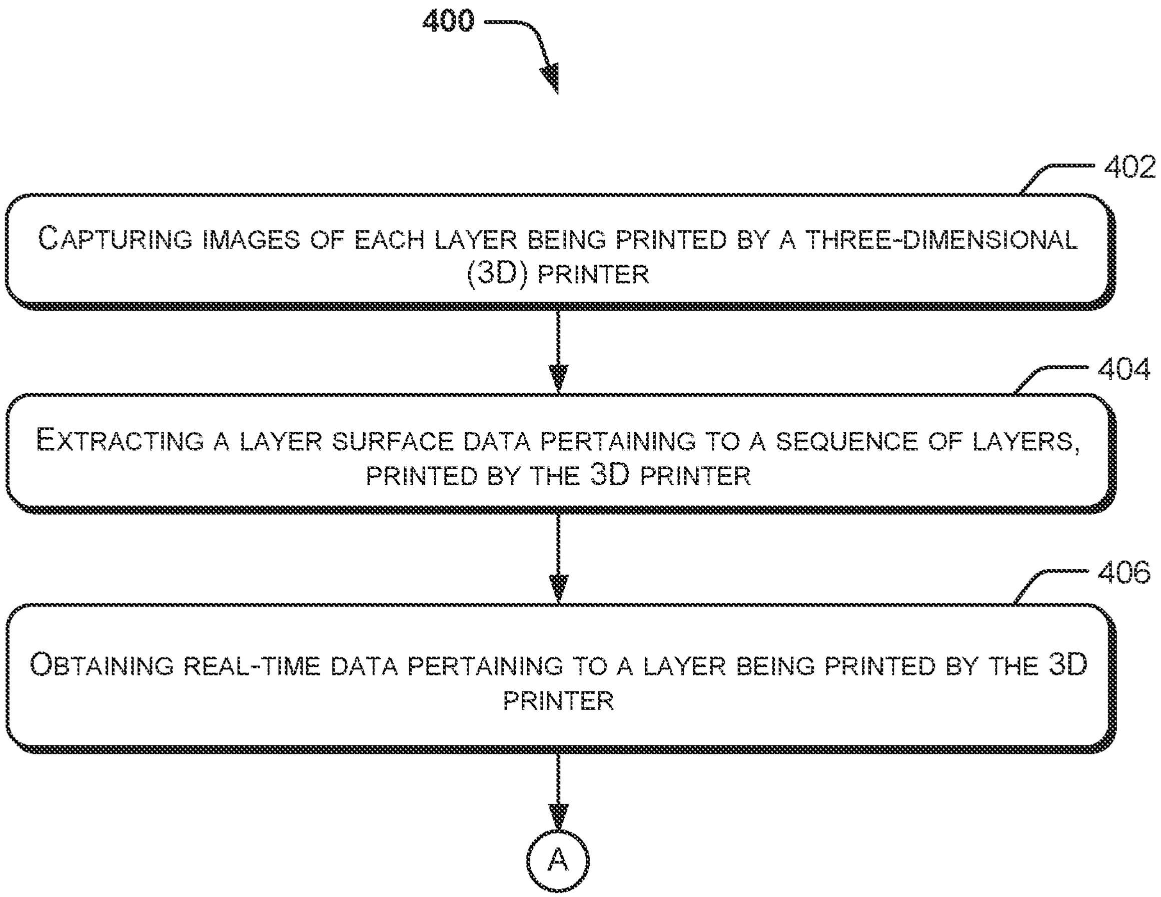
FIGS. 4A and 4B illustrate a method for detecting anomaly based on triangulation in a print job performed by a three-dimensional printer, according to an example.
Figure 4B:
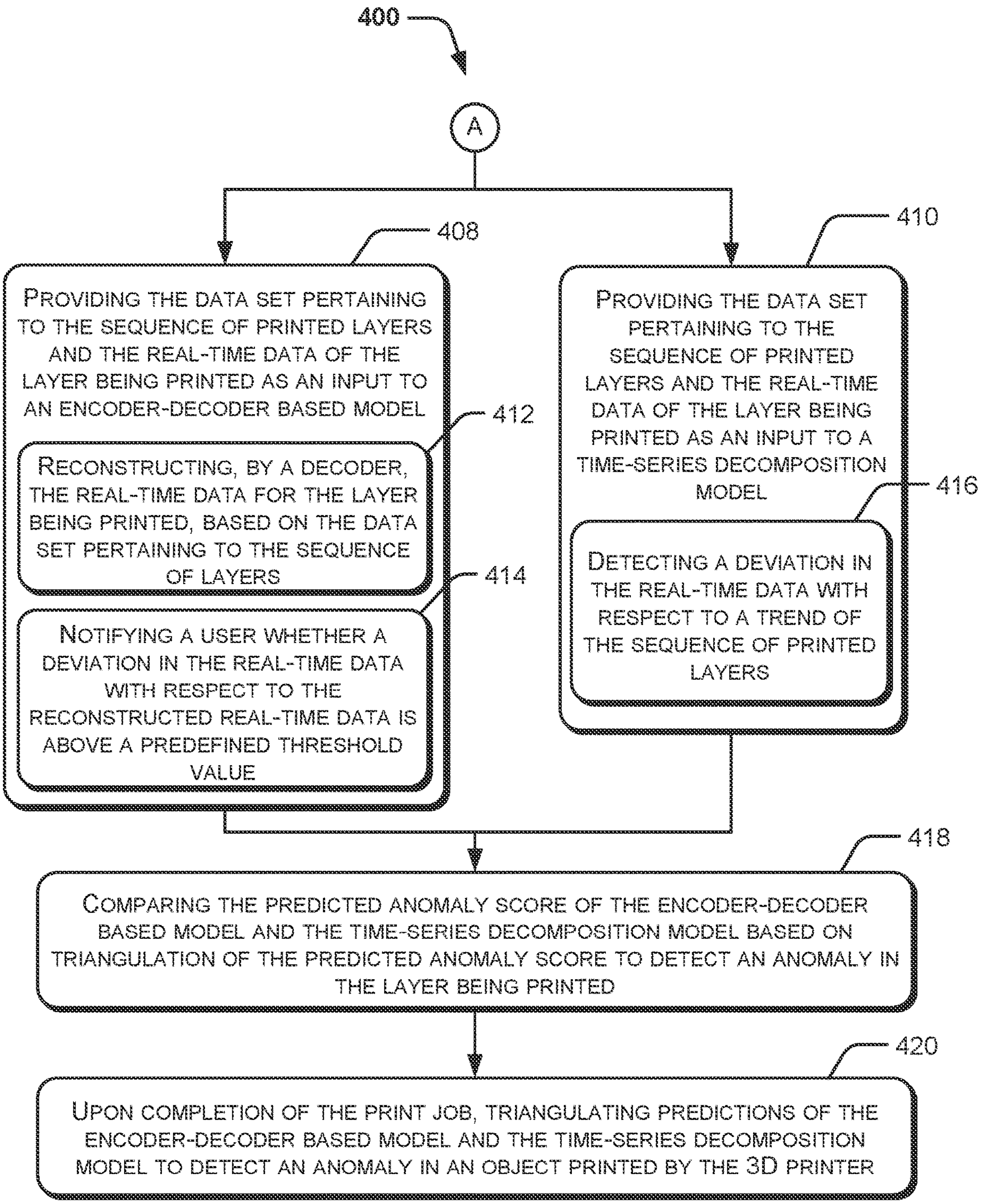

FIGS. 3, 4A, and 4B illustrate methods 300 and 400 for detecting anomaly based on triangulation in a print job performed by a three-dimensional (3D) printer, according to various examples. FIG. 4A describes various steps of the method 400 which is continued in FIG. 4B and therefore FIGS. 4A and 4B are to be considered as the same method. The 3D printer is similar to the 3D printer 102 which may fabricate a 3D object, or a part of the 3D object based on the print job. The methods 300 and 400 can be implemented by processor(s) or device(s) through any suitable hardware, a non-transitory machine readable medium, or a combination thereof. Further, although the methods 300 and 400 are described in context of the system and the 3D printer that are similar to the aforementioned system 100 and the 3D printer 102, other suitable devices or systems may be used for execution of the methods 300 and 400.

In some examples, processes involved in the methods 300 and 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a data set may be obtained from the 3D printer. In an example, a processor (not shown) of the system may obtain the data set from the 3D printer. The data set pertains to a sequence of layers printed by the 3D printer. For example, the data set may include, but is not limited to, layer thickness, drop in a print platform, post drop surface of a layer, print surface of a layer, post spread surface of a layer, and disturbance in print. In an example implementation, the sequence of layers may be pre-defined. In addition, real-time data pertaining to a layer being printed by the 3D printer may be obtained from the 3D printer. In an example implementation, the prediction engine may obtain the data set and the real-time data from the 3D printer.

At block 304, the method 300 may include providing the data set pertaining to the sequence of printed layers and the real-time data of the layer being printed as an input to an encode-decoder based model and a time-series model. Based on the sequence of printed layers and the real-time data of the layer being printed, the encoder-decoder based model and the time-series decomposition model may generate a respective predicted anomaly score for the layer being printed.

In an example implementation, the prediction engine may provide the data set and the real-time data to the machine learning models for interpretation. Based on the interpretation, the machine learning models may make predictions for the layer being printed by the 3D printer. Based on the predictions, the machine learning models may generate predicted anomaly scores.

In addition, at block 306, the method 300 may include comparing the predicted anomaly scores of the encoder-decoder based model and the time-series decomposition model based on triangulation of the predicted anomaly scores to detect an anomaly in the layer being printed. For example, the anomaly detection engine may perform triangulation of the predicted anomaly scores obtained for the encoder-decoder based model and the time-series decomposition model.

The present subject matter therefore employs deep learning techniques to detect real-time anomalies in the layers being printed by the 3D printer without conducting multiple tests, thereby saving time in detecting the anomalies. Further, triangulation of the predicted anomalies by two machine learning models facilitates in accurately capturing both global anomaly as well as local anomaly.

Referring to FIGS. 4A and 4B, in an example implementation, at block 402, the method 400 may include capturing images of each layer being printed by the 3D printer. In an example, the images of each layer may be captured by a stereovision camera mounted in a top lamp assembly of the 3D printer.

At block 404, the method 400 may include extracting a layer surface data pertaining to a sequence of layers, printed by the 3D printer. In an example, the processor may employ some image processing techniques to extract layer surface data pertaining to each layer during layer-by-layer printing.

At block 406, the method 400 may include obtaining real-time data pertaining to a layer being printed by the 3D printer. Further, at blocks 408 and 410, the method 400 may include providing the data set pertaining to the sequence of printed layers and the real-time data as an input to encoder-decoder based model and a time-series decomposition model.

In an example, the data set may include, but is not limited to, layer thickness, drop in a print platform, post drop surface of a layer, print surface of a layer, post spread surface of a layer, and disturbance in print. For example, the encoder-decoder based model may be a machine learned recurrent neural network (RNN) based model. The encoder may generate a hidden state representation of the sequence of printed layers, such as 10 layers. The hidden state representation may be indicative of a comprehensive summary of the sequence of printed layers.

Based on the hidden state representation, of the data set pertaining to the sequence of layers, generated by the encoder, at block 412, the decoder may reconstruct real-time data for the layer being printed by the 3D printer.

At block 414, the method 400 may include notifying a user whether a deviation in the real-time data with respect to the reconstructed data is above a predefined matching threshold value or not. If the reconstructed data and the real-time data obtained from the 3D printer indicates a mismatch, the decoder may detect an anomaly in the layer being printed. The prediction engine may accordingly generate a predicted anomaly score for the layer being printed.

At block 416, the method 400 may include detecting a deviation in the real-time data with respect to a trend of the data set pertaining to the sequence of layers. In an example, the time-series decomposition model may predict future values based on previously observed values. Data pertaining to all previously printed layers is provided as an input to the time-series decomposition model. As per the time-series decomposition model, an anomaly may be termed as a data point which is not following a common collective trend or seasonal or cyclic pattern of entire data pertaining to all previously printed layers. Upon detection of such a data point, the time-series decomposition model may generate a predicted anomaly score.

At block 418, the method 400 may include comparing the predicted anomaly score of the encoder-decoder based model and the time-series decomposition model based on triangulation of the predicted anomaly scores to detect an anomaly in the layer being printed. Based on the triangulation, the anomaly detection engine may detect the layer being printed as anomalous if a cross-correlation score of the predicted anomalies is above a statistically derived threshold.

At block 420, the method 400 may include upon completion of the print job, triangulating predictions of the encoder-decoder based model and the time-series decomposition model to detect the anomaly in an object printed by the 3D printer.

Figure 5:
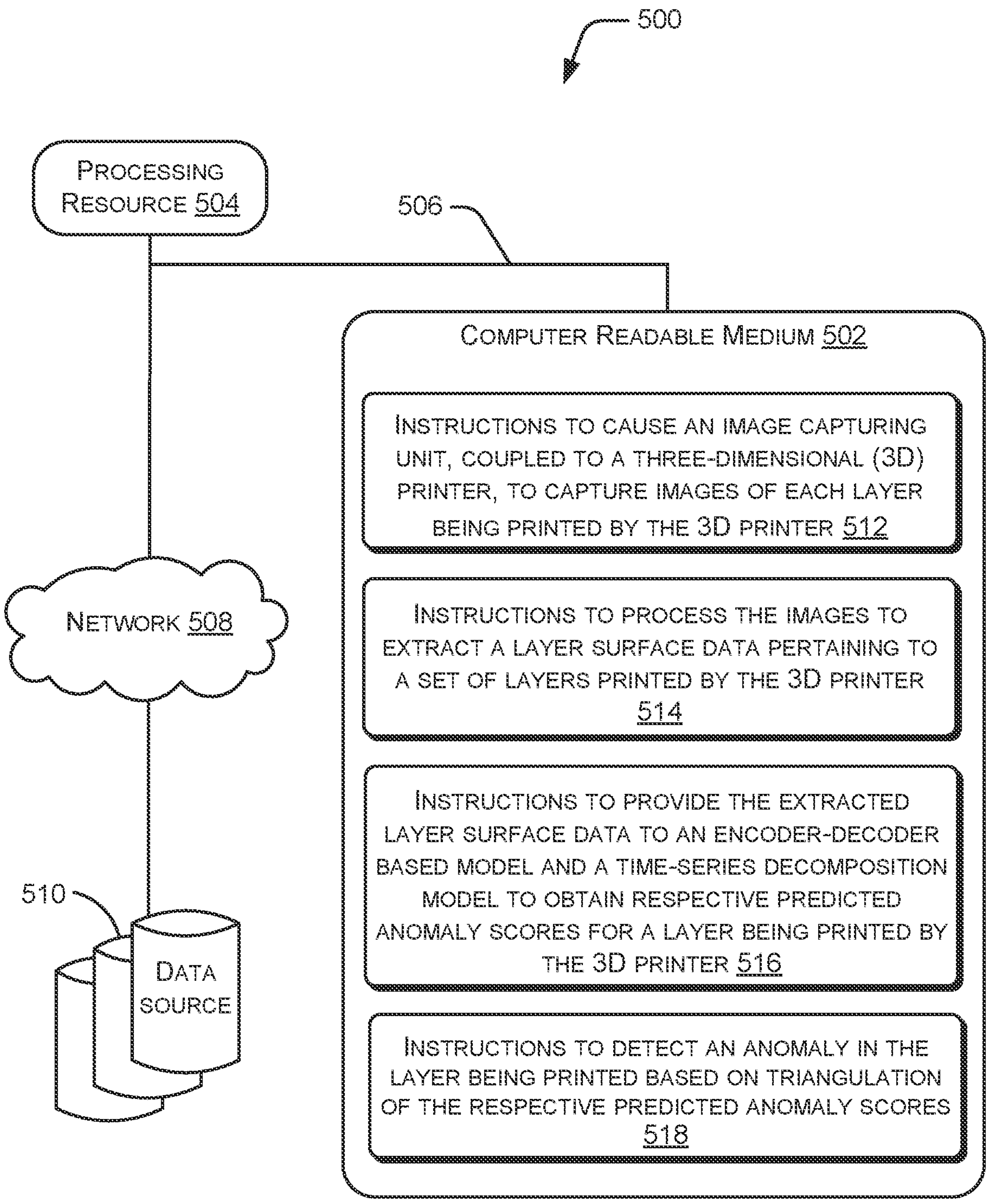
FIG. 5 illustrates a non-transitory computer readable medium for detecting anomaly based on triangulation in a print job performed by a three-dimensional printer, according to an example.

FIG. 5 illustrates an example network environment 500 using a non-transitory computer-readable medium 502 for detecting an anomaly in a print job performed by a three-dimensional (3D) printer based on triangulation, according to an example. The network environment 500 may be a public networking environment or a private networking environment. In one example, the network environment 500 includes a processing resource 504 communicatively coupled to the non-transitory computer-readable medium 502 through a communication link 506. For example, the processing resource 504 may be a processor of a system, such as the system communicating with the 3D printer, for fetching and executing computer-readable instructions from the non-transitory computer-readable medium 502.

The non-transitory computer-readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer-readable medium 502 through a network 508. The network 508 may be a single network or a combination of multiple networks and may use a variety of communication protocols.

The processing resource 504 and the non-transitory computer-readable medium 502 may also be communicatively coupled to data sources 510 over the network 508. The data sources 510 may include, for example, a database. The data sources 510 may be used by the database administrators and other users to communicate with the processing resource 504.

In an example, the non-transitory computer-readable medium 502 includes a set of computer-readable and executable instructions for detecting an anomaly in a print job performed by a 3D printer based on triangulation. The set of computer-readable instructions may include instructions as explained in conjunction with FIGS. 1 to 4B. The set of computer-readable instructions, referred to as instructions hereinafter, may be accessed by the processing resource 504 through the communication link 506 and subsequently executed to perform acts for detecting an anomaly in a print job performed by the 3D printer based on triangulation.

Referring to FIG. 5, in an example, the non-transitory computer-readable medium may include instructions 512 to cause an image capturing unit, coupled to the 3D printer, to capture images of each layer being printed by the 3D printer. In an example, the image capturing unit may be a stereovision camera. The stereovision camera may be mounted as in-situ layer measurement tool in the 3D printer.

The non-transitory computer-readable medium 502 may also include instructions 514 to process the images to extract layer surface data pertaining to a set of layers printed by the 3D printer. The processing may include image processing techniques to retrieve specific information. In an example, the layer surface data may include, but is not limited to, layer thickness, drop in a print platform, post drop surface of a layer, print surface of a layer, post spread surface of a layer, and disturbance in print.

Further, the non-transitory computer-readable medium 502 may also include instructions 516 to provide the extracted layer surface data to an encoder-decoder based model and a time-series decomposition model. Based on the extracted layer surface data, the encoder-decoder based model and the time-series decomposition model may provide respective predicted anomaly scores for a layer being printed by the 3D printer.

In an example, in addition to the extracted layer surface data, the encoder-decoder based model and a time-series decomposition model may be provided with sensor data pertaining to a plurality of sensors deployed in the 3D printer and layer data pertaining to the attributes of layers that may be printed. Examples of the layer data may include, but are not limited to, layer density data, fusing agent data, detailing agent data, z position of the layer, and so on.

In an example, the encoder-decoder based model may be trained for a predefined set of layers, such as last 10 printed layers, over about a million sequence records, where each sequence record contains six features. For example, the encoder-decoder based model may include long short-term memory (LSTM) units. An encoder may store past data by generating a comprehensive summary of a sequence of layers in the form of last hidden state representation in a reduced dimensional space. Thereafter, a decoder may reconstruct the sequence of layers from the last hidden state representation. Upon comparison of the reconstructed layer surface data with a layer surface data of the layer being printed, the encoder-decoder based model may identify a deviation between the reconstructed layer surface data and the layer surface data of the layer being printed. Such a deviation is indicated as a predicted anomaly score.

In an example, the time-series decomposition model may be trained for consecutive layers with breaks for new print jobs. The time-series decomposition model works on the underlying function:

$$y(l)=g(l)+s(l)+h(l)+\varepsilon$$

where, g(l) indicates a trend function which represents non-periodic changes in the value as a function of layer, s(l) represents periodic changes as a function of layer, h(l) represents break/gap effect as a function of layer, and ε represents a residual error term. During training, the time-series decomposition model learns above-mentioned function of layers along with a confidence interval. During prediction, if the y(l) is outside the confidence interval, y(l) is flagged as anomaly for layer l.

The non-transitory computer-readable medium 502 may also include instructions 518 to detect an anomaly in the layer being printed based on triangulation of the respective predicted anomaly scores. For example, the predicted anomaly scores of both models are cross correlated in a window of 10 layers to obtain a cross-correlation score. If the cross-correlation score is above a statistically derived threshold value, the anomaly is said to be detected.

In addition, upon detection of the anomaly, the non-transitory computer-readable medium 502 may include instructions to categorize the anomaly as one of a ghost layer anomaly, a layer phase shifting anomaly, and a crazing anomaly, based on contribution of features in the data set of each printed layer.

Further, the non-transitory computer-readable medium 502 may also include instructions to generate a quality assessment report indicating a quality of the print job of the 3D printer and a causal explanation of the detected anomaly. For example, the quality assessment report may indicate a layer quality degradation of all layers printed by the 3D printer. For example, upon detection of the anomaly, the anomaly detection engine may determine a root cause of the anomaly based on contribution of various factors that may be responsible for the detected anomaly. Based on the detected factor, the anomaly detection engine may categorize the detected anomaly as a ghost layer anomaly, layer phase shifting anomaly, or a crazing anomaly.

Although aspects for the present disclosure have been described in a language specific to structural features and/or methods, it is to be understood that the appended claims are not limited to the specific features or methods described herein. Rather, the specific features and methods are disclosed as examples of the present disclosure.

We claim:

1. A method comprising:

providing, by a processor, a data set pertaining to a sequence of layers that have been printed by a 3D printer in a print job for one or more objects, for interpretation by a first machine learning model and a second machine learning model;

providing, by the processor, real-time data of a current layer being printed by the 3D printer, which is subsequent to the sequence of layers that have been printed, to the first machine learning model and the second machine learning model;

based on the interpretation and the real-time data, obtaining, by the processor, a first predicted anomaly and a second predicted anomaly for the current layer being printed, from the first machine learning model and the second machine learning model, respectively;

detecting an anomaly in the current layer being printed based on triangulation of the first predicted anomaly and the second predicted anomaly; and after detecting the anomaly in the current layer, either terminating the print job to lessen build material wastage, or adjusting printing of the print job to minimize quality degradation of the objects.

2. The method of claim 1, wherein the first machine learning model is an encoder-decoder based deep learning model and the second machine learning model is a time-series decomposition model.

3. The method of claim 2, wherein the encoder-decoder based deep learning model comprises long short-term memory (LSTM) units to generate a summary of a sequence of the data set obtained for the sequence of layers.

4. The method of claim 1, wherein the detected anomaly is categorized as one of a ghost layer anomaly, layer phase shifting anomaly, and a crazing anomaly.

5. The method of claim 1, further comprising generating, by the processor in real-time and in response to detecting the anomaly, a notification informing degradation in a layer quality associated with the print job of the 3D printer to a user.

6. The method of claim 1, further comprising:

training the first machine learning model and the second machine learning model about a normal printing behavior of the 3D printer based on data sets pertaining to multiple sequences of printed layers; and storing a first trained machine learning model and a second trained machine learning model in a database.

7. The method of claim 1, wherein, after detecting the anomaly in the current layer, the print job is terminated.

8. The method of claim 1, wherein, after detecting the anomaly in the current layer, printing of the print job is adjusted.

9. A non-transitory machine-readable medium storing instructions executable by a processor to perform processing comprising:

providing a data set pertaining to a sequence of layers that have been printed by a 3D printer in a print job for one or more objects, for interpretation by a first machine learning model and a second machine learning model;

providing real-time data of a current layer being printed by the 3D printer, which is subsequent to the sequence of layers that have been printed, to the first machine learning model and the second machine learning model;

based on the interpretation and the real-time data, obtaining a first predicted anomaly and a second predicted anomaly for the current layer being printed, from the first machine learning model and the second machine learning model, respectively;

detecting an anomaly in the current layer being printed based on triangulation of the first predicted anomaly and the second predicted anomaly; and in response to detecting the anomaly in the current layer, either terminating the print job to lessen build material wastage, or adjusting printing of the print job to minimize quality degradation of the objects.

10. The non-transitory machine-readable medium of claim 9, wherein the first machine learning model is an encoder-decoder based deep learning model and the second machine learning model is a time-series decomposition model.

11. The non-transitory machine-readable medium of claim 10, wherein the encoder-decoder based deep learning model comprises long short-term memory (LSTM) units to generate a summary of a sequence of the data set obtained for the sequence of layers.

12. The non-transitory machine-readable medium of claim 9, wherein the detected anomaly is categorized as one of a ghost layer anomaly, layer phase shifting anomaly, and a crazing anomaly.

13. The non-transitory machine-readable medium of claim 9, wherein, in response to detecting the anomaly in the current layer, the print job is terminated.

14. The non-transitory machine-readable medium of claim 9, wherein, in response to detecting the anomaly in the current layer, printing of the print job is adjusted.

15. A system comprising:

a processor; and a memory storing instructions executable by the processor to perform processing comprising:

providing a data set pertaining to a sequence of layers that have been printed by a 3D printer in a print job for one or more objects, for interpretation by a first machine learning model and a second machine learning model;

providing real-time data of a current layer being printed by the 3D printer, which is subsequent to the sequence of layers that have been printed, to the first machine learning model and the second machine learning model;

based on the interpretation and the real-time data, obtaining a first predicted anomaly and a second predicted anomaly for the current layer being printed, from the first machine learning model and the second machine learning model, respectively;

detecting an anomaly in the current layer being printed based on triangulation of the first predicted anomaly and the second predicted anomaly; and in response to detecting the anomaly in the current layer, either terminating the print job to lessen build material wastage, or adjusting printing of the print job to minimize quality degradation of the objects.

16. The system of claim 15, wherein the detected anomaly is categorized as one of a ghost layer anomaly, layer phase shifting anomaly, and a crazing anomaly.

17. The system of claim 15, wherein, in response to detecting the anomaly in the current layer, the print job is terminated.

18. The system of claim 15, wherein, in response to detecting the anomaly in the current layer, printing of the print job is adjusted.

19. The system of claim 15, further comprising the 3D printer.

* * * * *